N. JOHNSON.
BEET DIGGER.
APPLICATION FILED APR. 19, 1911.
1,001,039.
Patented Aug. 22, 1911.
3 SHEETS—SHEET 1.
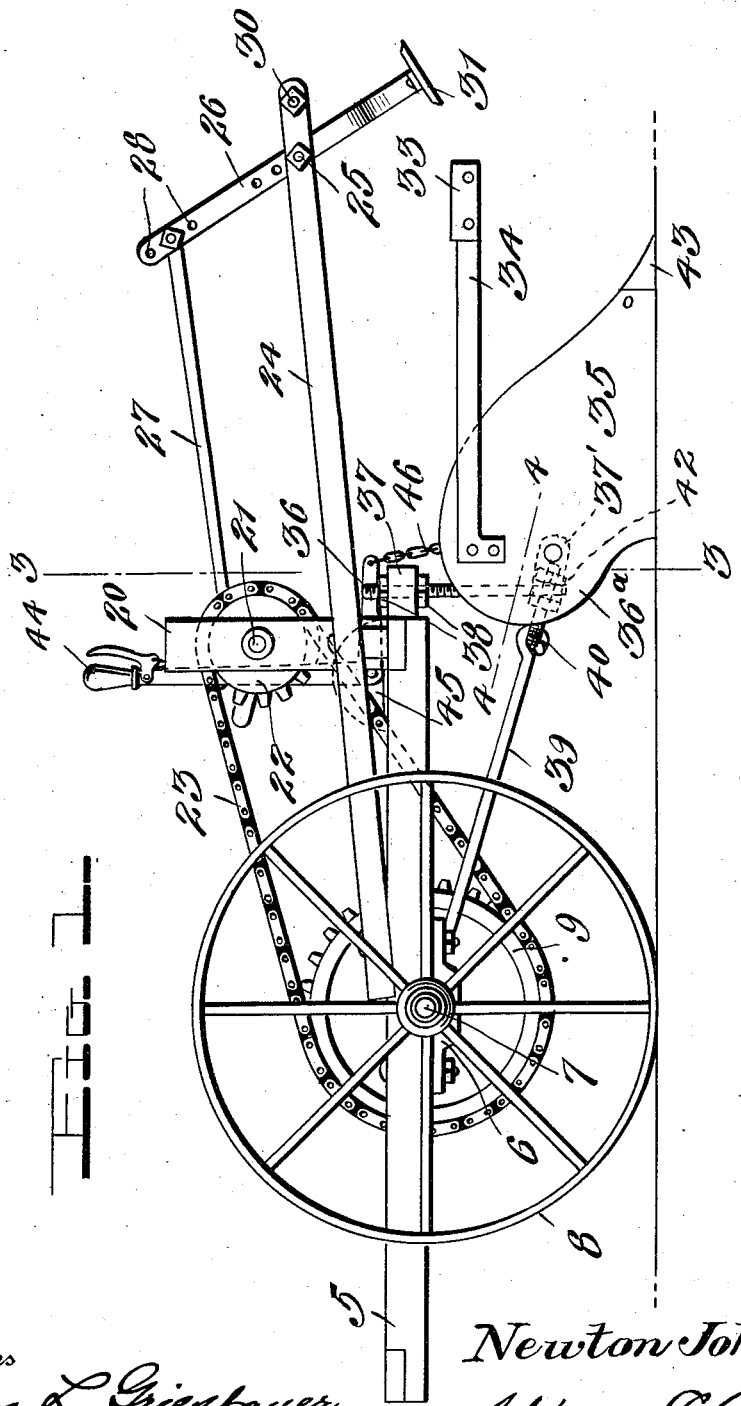
Witnesses
Chax. L. Griesbauer.
L. G. Ellis.
Inventor
Newton Johnson,
By Watson E. Coleman.
Attorney

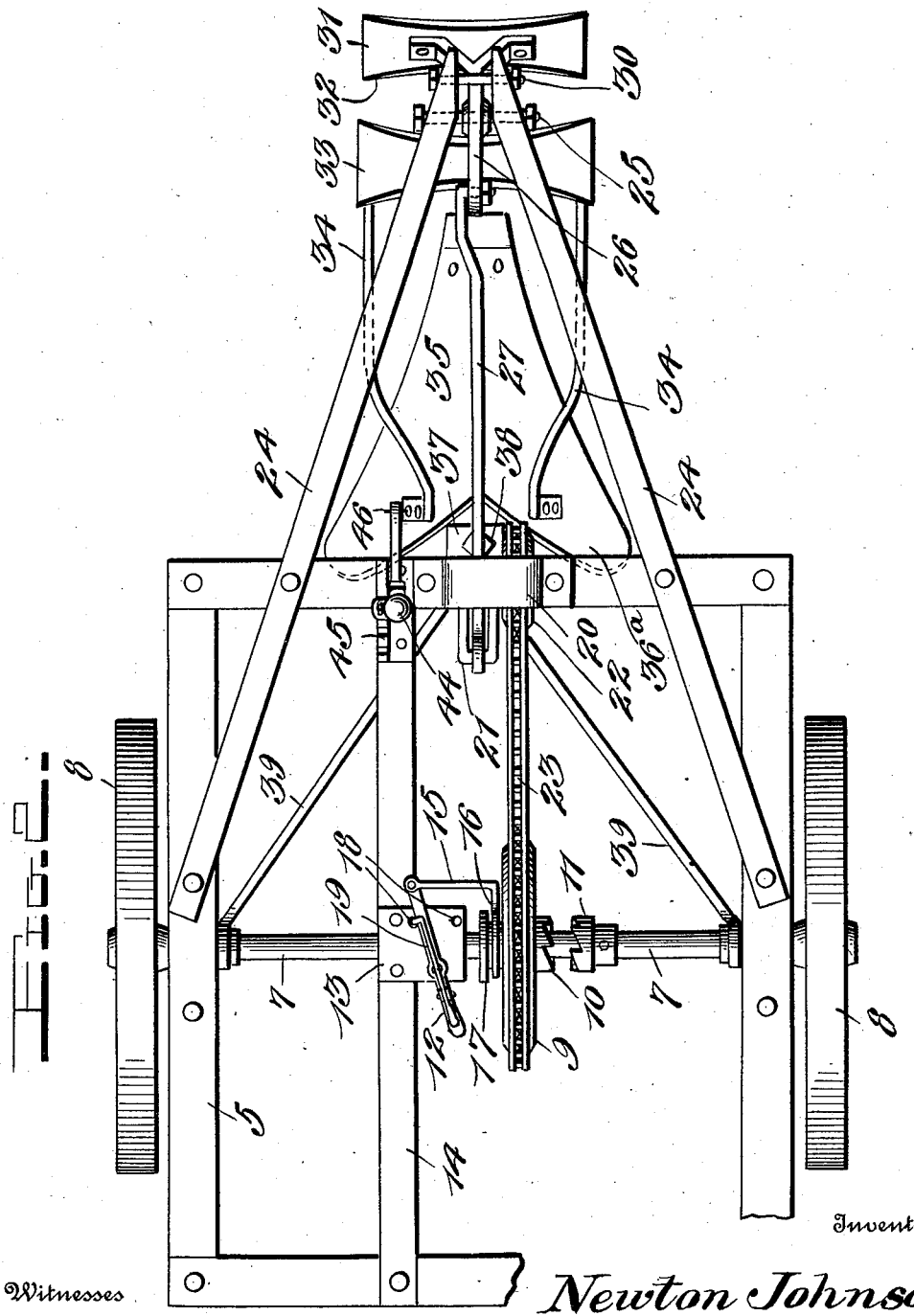

N. JOHNSON.
BEET DIGGER.
APPLICATION FILED APR. 19, 1911.
1,001,039.
Patented Aug. 22, 1911.
3 SHEETS—SHEET 3.
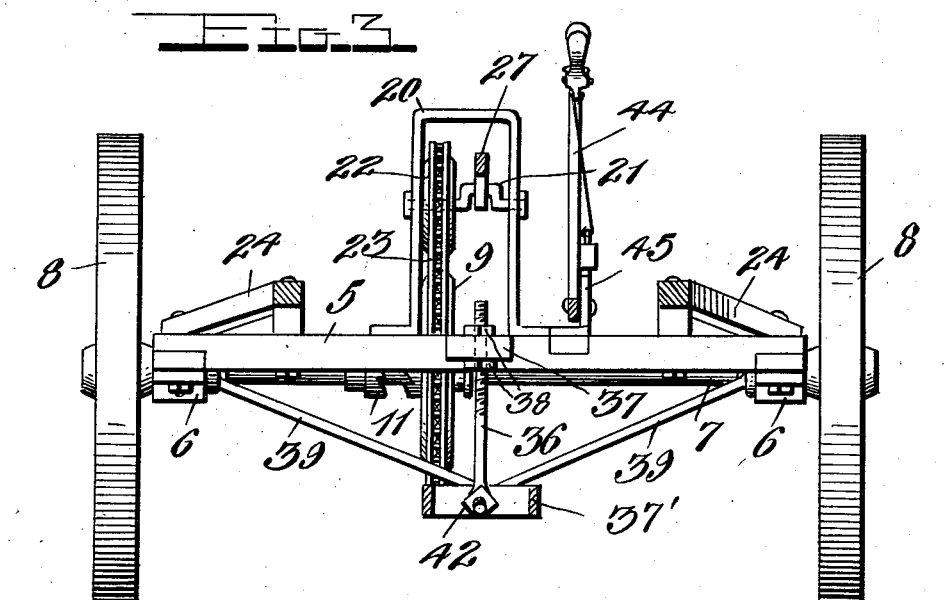
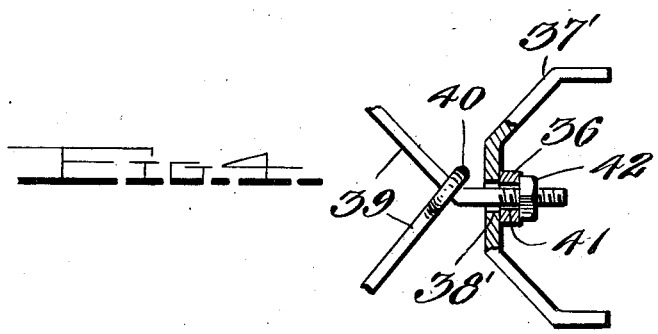
Witnesses
Chas. L. Griesbauer.
L. A. Ellis.
Inventor
Newton Johnson,
By Watson E. Coleman,
Attorney

UNITED STATES PATENT OFFICE.

NEWTON JOHNSON, OF BASALT, IDAHO.

BEET-DIGGER.

1,001,039.  Specification of Letters Patent.  Patented Aug. 22, 1911.

Application filed April 19, 1911. Serial No. 622,097.

*To all whom it may concern:*

Be it known that I, NEWTON JOHNSON, a citizen of the United States, residing at Basalt, in the county of Bingham and State of Idaho, have invented certain new and useful Improvements in Beet-Diggers, of which the following is a specification, reference being had to the accompanying drawings.

This invention relates to a combined beet digging and topping machine and has for its object to provide a machine of this character of comparatively simple construction whereby the beets may be simultaneously dug and their foliage removed.

A further object of the invention resides in the provision of a wheel supported plow, and means for adjusting the same to raise or lower the same so as to cause the plow point to enter the soil to the desired depth to turn the beets over upon the ground surface, and a cutting knife automatically actuated in the movement of the machine to top the beets as they are dug.

Still another object of the invention is to provide a stationary knife mounted upon the plow and located above the point thereof, and an oscillatory knife blade to co-act with the stationary knife, a crank shaft and driving connections between the crank shaft and the wheel shaft of the machine, and a pitman connecting the crank shaft with the oscillatory knife bar to actuate the latter.

With the above and other objects in view, the invention consists of the novel features of construction, combination and arrangement of parts hereinafter fully described and claimed, and illustrated in the accompanying drawings, in which—

Figure 1 is a side elevation of a beet digging and topping machine illustrating the same in practical use; Fig. 2 is a top plan view; Fig. 3 is a section taken on the line 3—3 of Fig. 1; and Fig. 4 is a detail section taken on the line 4—4 of Fig. 1.

Referring in detail to the drawings 5 designates a rectangular frame upon the longitudinal side bars of which suitable bearings 6 are mounted to receive the ends of the wheel axle 7. Upon each end of the wheel axle a ground wheel 8 is mounted to support the frame of the machine. A sprocket wheel 9 is loosely mounted upon the wheel axle and carries a clutch head 10 for engagement with a clutch head 11 rigidly fixed upon the axle 7 as shown in Fig. 2.

The sprocket 9 is longitudinally shiftable upon the wheel axle through the medium of a lever 12 pivotally mounted upon a plate 13 which is fixed to an intermediate longitudinal frame bar 14. One end of a rod 15 is pivotally connected to the lever 12 and the other end of said rod has a yoke 16 formed thereon for engagement with a collar 17 which is fixed to one face of the sprocket wheel 9. The plate 13 is provided with openings 18 to receive the end of a locking bar 19 which is pivotally mounted intermediate of its ends upon the lever 12. It will thus be seen that the sprocket wheel 9 may be readily shifted upon the wheel axle 7 and locked thereon in engagement with the clutch head 11, by simply actuating the lever 12 and engaging the end of the locking bar 19 in the proper opening 18 of the plate 13.

Upon the central portion of the front transverse bar of the frame 5, a U-shaped frame 20 is secured. In this frame a crank shaft 21 is mounted and a sprocket 22 is fixed upon said shaft. This sprocket is connected to the sprocket 9 by means of an endless chain 23 and is driven thereby in the movement of the machine. A pair of forwardly extending converging bars 24 are rigidly secured at their rear ends to the main frame 5. The forward ends of the bars 24 are connected by means of a bolt 25 upon which the knife bar 26 is mounted. A pitman 27 connects the upper end of this bar with the crank of the shaft 21. The knife bar 26 is preferably provided with a plurality of openings 28 whereby the connection of the pitman 27 thereto may be adjusted to regulate the extent of oscillatory movement of said knife bar. A tongue is adapted to be arranged between the forward ends of the bars 24 and is secured in position by means of the bolt 30. Upon this tongue suitable draft attachments are adapted to be arranged. To the lower end of the bar 26 a knife blade 31 is secured. This blade is transversely disposed with relation to the line of movement of the machine and the longitudinal edges thereof are concaved as shown at 32 in Fig. 2. This movable knife blade is adapted to co-act with a relatively stationary similar blade 33 which is fixed to the forward ends of the bars 34, the rear ends of said bars being rigidly secured to a plow 35. The upper end of a rod 36 is removably secured in a block 37 by means of the nuts 38 which are threaded upon said rod.

The plow 35 is of the double mold board type so that the earth is thrown to opposite sides of a central line. The rear ends of the mold boards 36ª are connected and braced by means of a transverse bar 37'. This bar is centrally provided with an opening 38' through which the forward end of one of the inwardly and downwardly inclined rods 39 extends. The rear ends of these rods are mounted upon the wheel axle 7, the other of said rods having its forward end bent around the first mentioned rod as shown at 40. The end of the rod which extends through the opening in the brace bar 37' is bent at an angle to the main portion of the rod and is disposed through an opening 41 in the lower end of the rod 36. A nut 42 is threaded upon the extremity of the rod 39 to retain the end of the rod 36 thereon. The plow point 43 is adapted to be raised or lowered to regulate the depth to which the same enters the soil by means of a lever 44 which is pivotally mounted upon a rack 45 arranged upon the forward end of the frame bar 14. A chain 46 is connected at one end to the lower end of the lever 44, and the other end of said chain is connected to one of the mold boards 36ª of the plow. As the rear ends of the rods 39 are loosely mounted upon the wheel axle 7, it will be readily seen that by manipulating the lever 44, the point of the plow 43 may be elevated or lowered as desired. The nuts 38 on the rod 36 are of course first loosened so that said rod may move through the block 37. The lever 44 provides means for easily and quickly elevating the plow, and by providing the rack 45 upon which the lever is adapted to be locked, the rod 36 is relieved of the entire weight of the plow.

The operation of my improved machine is as follows: The plow 35 is first adjusted so that its point is disposed the proper depth below the surface of the soil to engage under the beets or other vegetable as shown in Fig. 1. As the machine moves over the ground, rotary movement is imparted to the shaft 21 through the medium of the chain 23 and sprocket wheel 9 by shifting said sprocket on the wheel axle and locking the same thereon as previously described. This rotation of the crank shaft 21 reciprocates the pitman or connecting rod 27 whereby the knife bar 26 is oscillated in the forward ends of the converging bars 24. The knife blade 31 is disposed slightly above the plane of the blade 33 and moves over the surface thereof. The foliage of the vegetable which extends above the ground surface is caught between the concaved edge of the stationary knife blade and the rear edge of the movable blade whereby such foliage is severed. At the same time the plow entering beneath the vegetable turns the same over upon the top of the ground surface, the earth being thrown to each side of the furrow. In this manner the beets or other vegetables are simultaneously topped and turned over upon the surface of the ground so that they can be conveniently gathered. By performing the two operations simultaneously considerable time and labor are saved in the harvesting of such vegetables.

The machine is comparatively simple in construction and will efficiently perform the functions for which it is designed. The various parts are all of substantial and durable construction whereby the cost of repairs is reduced to a minimum.

While I have shown and described the preferred construction and arrangement of the various parts of my improved beet digging and topping machine, it will be understood that the same is susceptible of considerable modification without departing from the essential feature or sacrificing any of the advantages thereof.

Having thus described the invention what is claimed is:—

1. In a machine of the character described, the combination with a plow, of a stationary knife blade carried by said plow and disposed above the point thereof, a second knife blade mounted for oscillatory movement over the surface of said stationary blade, and means for oscillating said knife blade, substantially as and for the purpose specified.

2. In a machine of the character described, the combination with a wheel supported plow, of a stationary knife blade carried by said plow and disposed above the point thereof, a movable knife blade mounted for movement over the stationary blade, and means for actuating the movable blade in the movement of the plow, substantially as and for the purpose specified.

3. In a machine of the class described, the combination with a wheel supported plow, of a knife blade mounted upon said plow and disposed above the point thereof, means for raising and lowering said plow to vary the depth to which the same enters the soil, an oscillatory knife blade mounted above the stationary blade for movement thereover, means for adjusting said oscillatory blade with relation to the adjustment of the plow, and additional means for oscillating said knife blade, substantially as and for the purpose specified.

4. In a machine of the character described, the combination with a wheel supported frame, and a plow mounted upon said frame, of a stationary knife blade carried by the plow, forwardly extending converging bars secured to the frame, a movable knife mounted in the forward ends of said converging bars for movement over the stationary knife blade, a crank shaft mounted on the frame, and a pitman connecting the crank of said shaft to the movable knife to oscillate the same, substantially as and for the purpose specified.

5. In a machine of the class described, the combination with a wheel supported frame and a plow supported for vertical movement beneath the forward end of the frame, of a stationary knife blade carried by said plow, forwardly converging bars secured to the frame, a vertical oscillatory bar adjustably mounted in said converging bars, a knife blade secured to the lower end of said oscillatory bar adapted for movement over the stationary blade, a crank shaft mounted upon said frame, operating connections between said crank shaft and the wheel axle of the machine, a pitman connecting the crank of said shaft to said oscillatory bar to oscillate the knife carried thereby, means mounted upon the frame and connected to said plow for elevating the same, and means for rigidly securing the plow in position, substantially as and for the purpose set forth.

6. In a machine of the character described, the combination with a wheel supported frame, of a plow arranged beneath the forward end of said frame, a rod vertically adjustable on the frame, a pair of forwardly extending inwardly and downwardly converging rods secured to the frame, said plow being mounted upon one of the rods, the lower end of said vertically movable rod being removably secured to said converging rod, means for elevating the plow, means for rigidly securing said vertical rod against movement, a stationary knife blade mounted upon the plow, a movable knife blade adapted for movement over said stationary blade, and means for moving said movable knife blade in the forward movement of the machine, substantially as and for the purpose specified.

In testimony whereof I hereunto affix my signature in the presence of two witnesses.

NEWTON JOHNSON.

Witnesses:
 GRADY QUINN,
 CHARLES B. McCURDY.

---

Copies of this patent may be obtained for five cents each, by addressing the "Commissioner of Patents, Washington, D. C."